(12) United States Patent
Benhanokh et al.

(10) Patent No.: US 11,169,927 B2
(45) Date of Patent: Nov. 9, 2021

(54) EFFICIENT CACHE MANAGEMENT

(71) Applicant: EMC IP Holding Company LLC, Hopkinton, MA (US)

(72) Inventors: Gabriel Benhanokh, Tel-Aviv (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 16/692,386

(22) Filed: Nov. 22, 2019

(65) Prior Publication Data
US 2021/0157740 A1 May 27, 2021

(51) Int. Cl.
*G06F 12/0893* (2016.01)
*G06F 12/0877* (2016.01)
*G06F 12/0871* (2016.01)

(52) U.S. Cl.
CPC ...... *G06F 12/0893* (2013.01); *G06F 12/0871* (2013.01); *G06F 12/0877* (2013.01)

(58) Field of Classification Search
CPC ............. G06F 12/0893; G06F 12/0871; G06F 12/0877
See application file for complete search history.

(56) References Cited

U.S. PATENT DOCUMENTS

| | | | | |
|---|---|---|---|---|
| 10,019,365 B2* | 7/2018 | Breternitz | ........... | G06F 12/0802 |
| 10,102,147 B1 | 10/2018 | BenHanokh et al. | | |
| 10,558,579 B1* | 2/2020 | Goli | ...................... | G06F 12/123 |
| 2010/0223382 A1* | 9/2010 | Rayes | ................. | H04L 41/0856 |
| | | | | 709/225 |
| 2015/0134911 A1* | 5/2015 | Krishnaprasad | .... | G06F 12/0811 |
| | | | | 711/120 |
| 2016/0266844 A1* | 9/2016 | Ogawa | .................. | G06F 3/0647 |

OTHER PUBLICATIONS

U.S. Appl. No. 16/389,383, filed Apr. 19, 2019, Wigmore, et al.

* cited by examiner

*Primary Examiner* — Idriss N Alrobaye
*Assistant Examiner* — Sakhr A Aldaylam
(74) *Attorney, Agent, or Firm* — Muirhead and Saturnelli, LLC

(57) ABSTRACT

A distributed cache is managed. In some embodiments, only a subset of a plurality of processing nodes may be designated as cache managers that manage the cache access history of a logical area, including having an exclusive right to control the eviction of data from cache objects of the logical area. In such embodiments, all of the processing nodes may collect cache access information, and communicate the cache access information to the cache managers. Some of the processing nodes that are not cache managers may collect cache access information from a plurality of the other non-cache managers. Each such processing node may combine this communicated cache access information with the cache access information of the processing node itself, sort the combined information per cache manager, and send the resulting sorted cache access information to the respective cache managers. The processing nodes may be arranged in a cache management hierarchy.

20 Claims, 6 Drawing Sheets

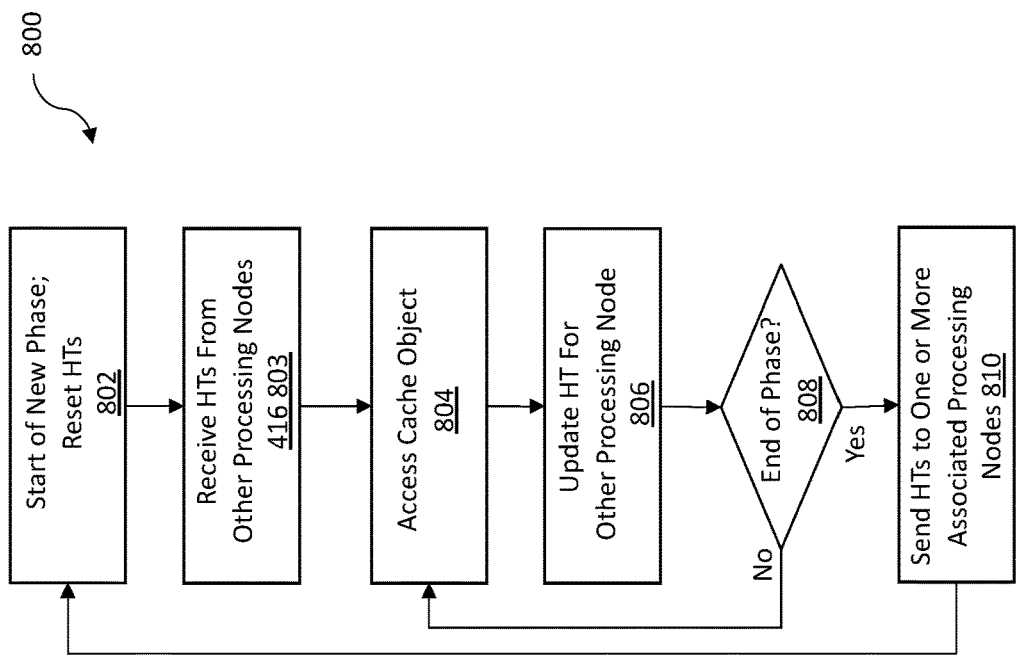
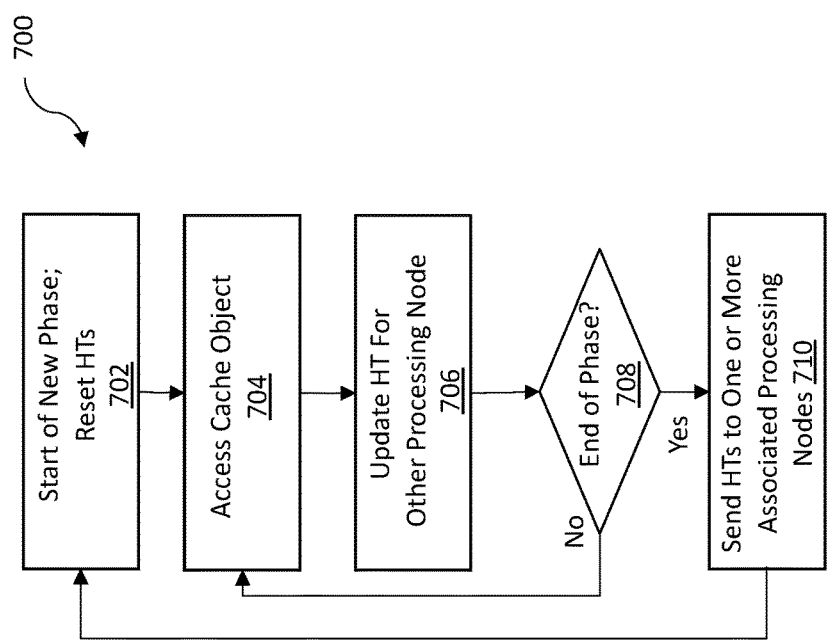

EFFICIENT CACHE MANAGEMENT

BACKGROUND

Technical Field

This application generally relates to data storage systems, and more particularly to managing cache on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform IO operations utilizing a physical storage device of the storage system, one or more components of the host system, storage system and network components therebetween may be used.

Host systems may not address the physical storage devices (e.g., disk drives or flash drives) of a storage systems directly, but rather access to data may be provided to one or more host systems from what the host systems view as a plurality of logical storage units (LSUs) including, for example, logical blocks, logical devices (also referred to as logical volumes, LUNs, logical storage units and/or logical disks), thin devices, groups of logical devices (e.g., storage groups), NVMe namespaces, and other types of LSUs. LSUs are described in more detail elsewhere herein.

SUMMARY OF THE INVENTION

In some embodiments, a method is performed for a system including a plurality of physically discrete processing nodes, wherein each processing node includes a computation component and a memory, and a cache distributed across the plurality of processing nodes, wherein each of the processing nodes collects cache access information for the cache in response to IO operations performed by the processing node. The method includes: designating a first subset of the processing nodes as cache managers, each cache manager having an exclusive right to evict data from cache objects in a respective logical area of the cache, on at least two processing nodes of a second subset of the processing nodes: collecting cache access information over at least one period of time, including first cache access information corresponding to a first logical area of the cache for which a first of the cache managers has an exclusive right to evict data from cache objects, and communicating at least the first cache access information to at least the first cache manager. The method further includes the first cache manager updating cache management information used in selecting cache objects to evict based at least in part on the first cache access information. The collected cache access information may include one or more second cache access information, each second cache access information corresponding to a respective second logical area of the cache, where, for each second logical area of the cache, a respective cache manager of the first subset has an exclusive right to evict data from cache objects, where the method may further includes, for each second cache access information corresponding to a respective second logical area of the cache, the at least two processing nodes communicating the second cache access information to the respective cache manager of the second logical area, and each cache manager of the second logical area updating cache management information used in selecting cache objects to evict based at least in part on the first cache access information. The method may further include each of at least two processing nodes of the second subset: receiving, from a respective plurality of other processing nodes of the second subset, cache access information collected by the respective plurality of the other processing nodes, and aggregating the received cache access information with cache access information collected on the processing node in response to IO operations performed by the processing node to produce aggregated cache access information, where each of the at least first cache access information and the one or more second cache access information include a portion of the aggregated cache access information. The cache managers of the first subset may form a highest level in a cache management hierarchy, the at least two processing nodes of the second subset may form a first middle level of the cache management hierarchy, and the other processing nodes of the second subset may form a lowest level of the cache management hierarchy, where the method may further include: determining a total number of processing nodes on the system, and, based on the total number of processing nodes, grouping a subset of the processing nodes of the lowest level to create a second middle level of the cache management hierarchy between the first middle level and the lowest level, each processing node of the second middle level aggregating cache information received from two or more processing nodes that remain in the lowest level, and communicating the aggregated cache information from two or more processing nodes to a respective processing node of the first middle level. The method may further include each of the at least first cache manager aggregating the at least first cache access information with cache access information collected on the first cache manager in response to IO operations performed by the first cache manager to produce aggregated cache access information, where the at least first cache manager evicts data from cache objects in a respective logical area of the cache based at least in part on the aggregated cache access information. The at least one period of time may include a plurality of periods of time, each of the plurality of periods of time having a first predefined length, where the first cache access information is communicated to the at least first cache manager at predefined intervals of time corresponding to the plurality of periods of time. The method may further include the first cache manager evicting data from one or more cache objects in the first logical area of the cache in response to receiving an I/O operation specifying a data portion that does not have a cache object in cache.

In some embodiments, a system includes a plurality of physically discrete processing nodes, each processing node including a computation component and a memory, and a cache distributed across the plurality of processing nodes, where each of the processing nodes collects cache access information for the cache in response to IO operations performed by the processing node, and where one or more of the memories of the processing nodes collectively have code stored that, when executed, performs the above-described method.

In some embodiments, one or more computer-readable media, for example, non-transitory computer-readable media, are provided for a system including a plurality of physically discrete processing nodes, each processing node including a computation component and a memory, and a cache distributed across the plurality of processing nodes, where each of the processing nodes collects cache access information for the cache in response to IO operations performed by the processing node. The one or more computer-readable media has software stored thereon that includes executable instructions to perform the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 7 illustrates an example of a method of a leaf node of a cache management hierarchy handling cache access information for a shared cache, according to embodiments of the invention;

FIG. 8 illustrates an example of a method of a branch node of a cache management hierarchy handling cache access information for a shared cache, according to embodiments of the invention.

DETAILED DESCRIPTION OF EMBODIMENTS

Figure 2:
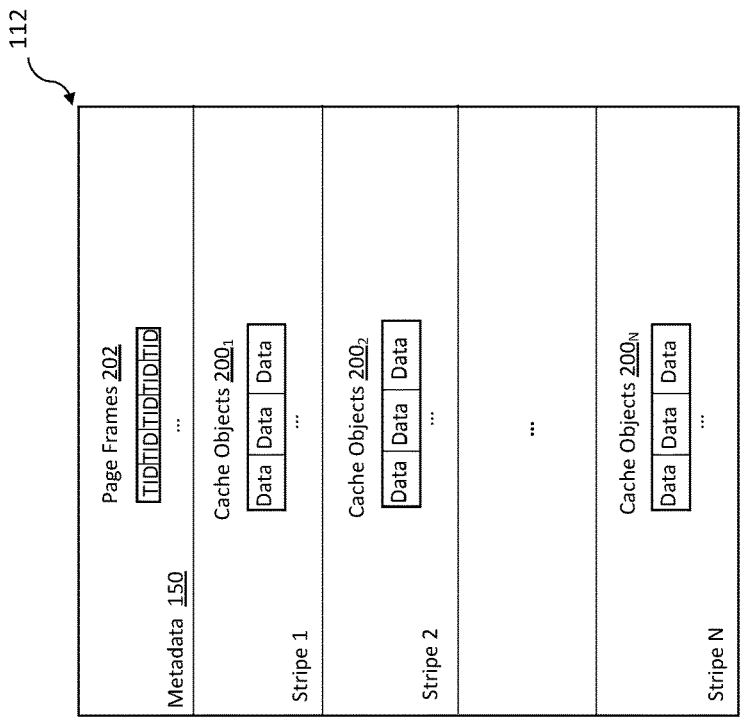
FIG. 2 illustrates an example of a shared cache of a storage system, according to embodiments of the invention.

Some storage systems (e.g., storage arrays) may include a plurality of physically discrete and interconnected processing nodes, where each processing node has at least a compute component (e.g., a CPU core) and memory. For example, a PowerMax™ system made available from Dell EMC may include a plurality of interconnected director boards, where each director board may be considered a processing node. In such storage systems, a cache used in processing IO operations may be distributed across multiple processing nodes, as described in more detail elsewhere herein. For example, at least a portion of the memory on each processing node may be used to implement a part of the shared cache, for example, as part of a global memory (GM) distributed across the processing nodes. As used herein, a "shared cache" is a cache that is distributed across multiple processing nodes, the use of which is shared by the multiple processing nodes.

It should be appreciated that, while embodiments of the invention are described herein in relation to the physical discrete processing nodes of a storage system, the invention is not so limited. For example, the processing nodes may be discrete processing or computational elements of another type of system, for example, servers of a distributed network service, components (e.g., blades) of a hyper-converged systems, or nodes of any of a variety of types of node clusters, for example, node of a network (e.g., cloud) service such as Amazon Cloud Services (AWS), Google on-line services, etc. Further, while embodiments herein are directed to managing metadata of a storage system, for example, applying novel LRU techniques to storage metadata, the techniques and mechanisms described herein, including the novel LRU techniques, may be applied to other types of metadata or other types of objects altogether.

In storage systems in which cache is distributed across multiple processing nodes, all of the processing nodes may be configured to collectively manage the access history of the entire cache, including each processing node evicting data from any cache object of the cache as needed. However, for reasons described in more detail elsewhere herein, such collective management of all cache objects may be computationally inefficient. Another approach is to have each of the plurality of processing nodes designated to manage the cache access history of a logical area of the cache ("logical cache area," which is not necessarily a contiguous physical area of the cache), including having an exclusive right (amongst processing nodes) to control the eviction of data from cache objects (e.g., cache slots) of the logical cache area. Using this approach, while a processing node may be designated to manage the cache access history and evictions from a logical cache area of the cache, other processing nodes may still access the cache objects of the logical cache area, and the designated processing node should be informed about these accesses to maintain an accurate cache access history of the logical cache area.

Accordingly, in some embodiments described in more detail elsewhere herein, for each defined logical cache area of the cache, each processing node may record its access to the cache objects of the logical cache area over predetermined temporal intervals of time as part of processing IO operations. At the end of each interval, each processing node may communicate its recorded cache access information for each logical cache area to the respective processing node to which the logical cache area is designated—i.e., the processing node that owns the logical cache area or the "owning processing node." Each owning processing node then may update the cache access history for the cache objects of the logical cache area it owns, and, in response to an IO operation received on the processing node that required allocation of a cache object, may select one of the cache objects of the logical cache area for eviction based on the cache access history for the cache objects of the logical cache area, and evict from the selected cache object to populate it with data from the received IO operation. Embodiments of the foregoing technique are described in U.S. Pat. No. 10,102,147, titled "Phased Based Distributed LRU for Shared Cache Systems" by BenHanokh et al., granted Oct. 16, 2018.

The foregoing approach may be desirable with a relatively low number of processing nodes. However, this approach may not scale well to larger numbers of processing nodes as the number of communications of cache access information between processing nodes for each interval (=n*(n−1), where n is the number of processing node) increases. For example, for hyper-converged architectures, the number of processing nodes may be tens or hundreds of thousands or even more. The amount of required communications of cache access information for such systems may cause excessive congestion and consumption of compute and communication (e.g., networking) resources on the system Accordingly, what is desired is a technique for managing a shared cache for systems having a large number of processing nodes over which the cache is distributed that makes more efficient use of computational and communication resources than known techniques.

Described herein are improved mechanisms and techniques for managing a shared cache. In some embodiments, in contrast to the known approach described above, only a subset of the plurality of processing nodes (as opposed to all of the processing nodes) may be designated as cache managers that manage the cache access history of a logical cache area, including having an exclusive right to control the eviction of data from cache objects of the logical cache area. In such embodiments, all of the processing nodes may collect cache access information, and communicate the cache access information to the cache managers. In some embodiments, some of the processing nodes that are not cache managers may collect cache access information from a plurality of the other non-cache managers. Each such processing node may combine this communicated cache access information with the cache access information of the processing node itself, sort the combined information per cache manager, and send the resulting sorted cache access information to the respective cache managers.

In some embodiments, the plurality of processing nodes may be arranged in a cache management hierarchy, in which the cache managers are at a top level of the hierarchy, and may be considered root nodes of the hierarchy, and the remaining processing nodes are at one or more lower levels of the cache management hierarchy. A lowest of the one or more lower levels (i.e., the bottom level) may include processing nodes that are considered leaf nodes. Leaf nodes are nodes that record and sort only cache access information that results from IO operations performed on the leaf node itself; i.e., it does not receive and/or sort cache access information from any other processing nodes. In embodiments in which there is only one lower level, the bottom level, the leaf nodes may communicate the sorted cache access information directly to the respective cache managers. Specifically, for each phase, the leaf nodes may maintain separate data sets (e.g., hash tables as described in more detail elsewhere herein) for each cache manager, each data set having only cache access information for the logical cache area designated to the respective cache manager, and may communicate the separate data sets to their respective cache managers at the end of each phase.

In some embodiments, the cache management hierarchy may have one or more lower levels above the lowest level, which may be referred to herein as middle levels, and include processing nodes that may be considered branch nodes. Branch nodes record and sort not only cache access information that results from IO operations performed on the branch node itself; but record and sort cache access information received from multiple processing nodes from a next lowest level of the hierarchy. If the cache management hierarchy only includes three levels—the highest level of root nodes, a middle level of branch nodes and a bottom level of leaf nodes—then branch nodes record and sort cache access information received from multiple leaf nodes. If there are more than three levels in the cache management hierarchy, then there are at least two middle levels of branch nodes, and at least one of the middle levels records and sorts cache access information received from a branch nodes of a next-lowest middle level, and the highest middle level of branch nodes communicate their sorted data sets of cache access information to respective cache managers of the top level.

By having only a subset of the processing nodes serve as cache managers, and including implementing one or more middle levels in a cache management hierarchy in some embodiments, the number of communications of cache access information may be reduced, in some cases by orders of magnitude, thereby reducing the system resources consumed in managing a shared cache.

Accordingly, in some embodiments described in more detail elsewhere herein, for each defined logical cache area of the cache, each processing node may record its access to the cache objects of the logical cache area during predetermined collection intervals (i.e., phases) as part of processing IO operations. At the end of each phase, each processing node may communicate its recorded cache access information for each logical cache area to the respective processing node to which the logical cache area is designated—i.e., the owning processing node. Each owning processing node then may update the cache access history for the cache objects of the logical cache area it owns. In response to an IO operation received on the processing node that requires allocation of a cache object, a processing node may select one of the cache objects of its designated logical cache area for eviction based on the cache access history for the cache objects of the logical cache area, and evict from the selected cache object so the cache object can be populated with data from the received IO operation.

Illustrative embodiments of the invention will now be described in more detail in relation to the figures.

Figure 1:
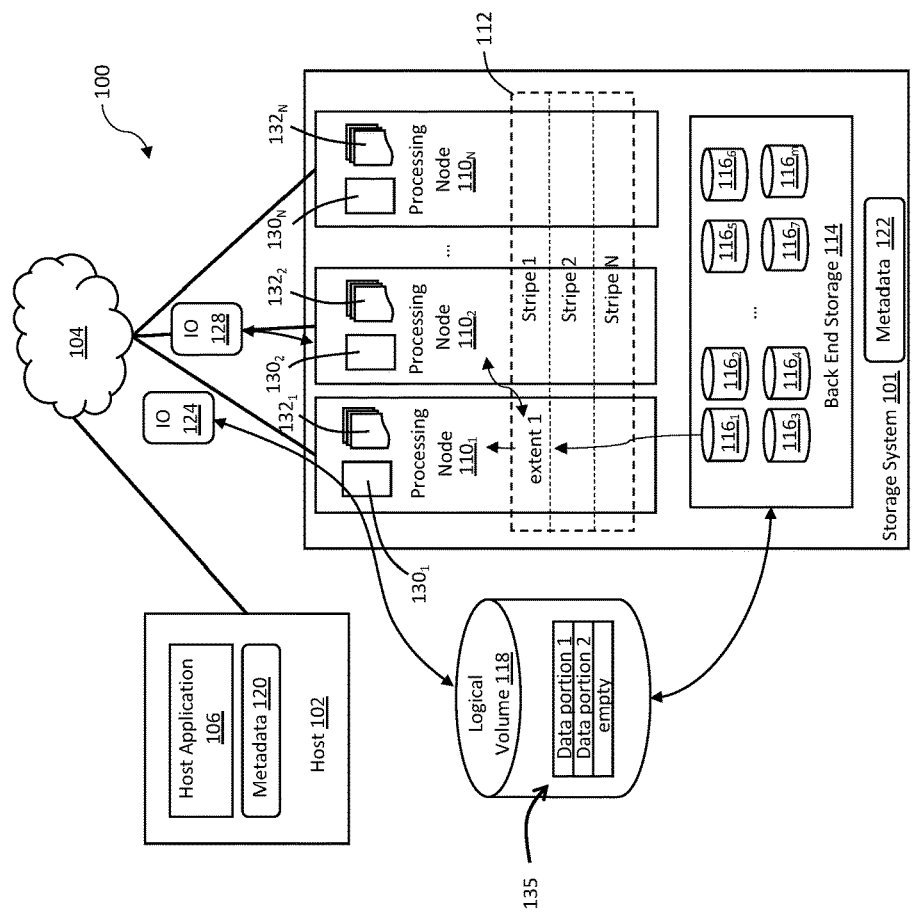
FIG. 1 illustrates an example of a data storage network, according to embodiments of the invention.

FIG. 1 illustrates an illustrative data storage network 100. Although the illustrated data storage network 100 includes a single data storage system 101 and a single external host 102, any number of hosts and data storage systems could be included in the data storage network 100. The host 102 may be connected to the storage system 101 via a network 104. The network 104 may include various types of network nodes, e.g., switches, routers, hubs, and other network devices, and may include one or more of the Internet, a WAN (wide area network), MAN (metropolitan area network), LAN (local area network), and SAN (Storage Area Network). The host 102 uses storage services provided by the storage system 101 via the network 104.

The host 102 may include a tangible server computer with memory, storage and processors. The host might also include a virtual host running on a virtual machine or container using processing and memory resources of a tangible server computer. Although an external host 102 is illustrated, internal hosts may be instantiated within the storage system 101. The host 102 operates a host application 106 that utilizes storage services provided by the storage system 101. There may be any number of host applications running on the host. Examples of host applications include but are not limited to a database, file server and block server.

The storage system 101 may include N interconnected processing nodes $110_1$-$110_N$, a shared cache 112 and back-end storage 114. Each of the processing nodes $110_1$-$110_N$ may include a compute component (e.g., one or more CPU cores) and memory. As illustrated, the shared cache 122 may be distributed across the plurality of processing nodes $110_1$-$110_N$, where a portion of the memory of each processing node may be used to implement a part of the shared cache. The processing nodes, shared cache and back-end storage may be, but are not necessarily, located in the same geographic location and may be located within the same chassis or rack. The processing nodes $110_1$-$110_N$ may include "vanilla" storage server computers and specialized computer hardware platforms including, but not limited to, storage directors that are specifically designed for use in storage systems. The memory implementing the shared cache (e.g., on the processing nodes) may include a wide variety of types of RAM (random access memory) and high performance SSDs (solid state devices). Back-end storage 114 includes physical storage devices $116_1$-$116_m$, which may include HDDs (hard disk drives) and SSDs, for example, and without limitation.

The processing nodes $110_1$-$110_N$ maintain at least one logical volume 118 that may be backed by the physical storage devices $116_1$-$116_m$. Without limitation, the logical volume may be referred to as a production LUN or host LUN, where LUN (logical unit number) is a number used to identify the logical volume in accordance with the SCSI (small computer system interface) protocol. The logical volume 118 represents an abstraction layer between the back-end storage 114 and the host 102. From the perspective of the host 102, the logical volume 134 may be a single data storage device having a set of contiguous fixed-size LBAs (logical block addresses) on which data used by the host application resides, as described by host metadata 120. However, the data used by the host application may actually be maintained by the processing nodes at non-contiguous addresses on various different physical storage devices of the back-end storage. The storage system 101 maintains metadata 122 indicative of the locations of data portions on the physical storage devices. Consequently, the processing nodes may use the metadata 122 to determine the actual location of data on the physical storage devices $116_1$-$116_m$ based on a reference to the logical volume 118 in an IO from the host 102 based on host metadata 120.

Data associated with the servicing of an IO from the host may be temporarily stored in the shared cache 112. For example, if processing node $110_1$ is servicing an IO 124 that contains a request to read data portion 1 (e.g., a track, extent or other unit of data) from logical volume 118, then the processing node $110_1$ may use the metadata 122 to find the location of data portion 1 in back-end storage 114, e.g., on data storage device $116_1$, and may prompt data portion 1 to be copied from data storage device $116_1$ to the shared cache 112. For purposes of explanation, the foregoing assumed that a "cache miss" (i.e., "read miss") occurs, i.e., that data portion 1 is not already present in the shared cache 112 when IO 124 is received. The processing node then accesses the cached copy of data portion 1 in order to return a copy of data portion 1 to the host application 106 in order to service the read request of IO 124. The processing node may use an RDMA (remote direct memory access) operation to access the copy of data portion 1 in the shared cache.

In another example, if IO 124 contains a request to write data portion 1 to logical volume 118, then the processing node $110_1$ copies data portion 1 from the IO 124 into the shared cache 112, e.g., using an RDMA operation. The processing node then uses the metadata 122 to find the location of data portion 1 (or a location for new data portion 1) on data storage device $116_1$ in back-end storage 114. The copy of data portion 1 may reside in the shared cache 112 for some period of time but may be eventually de-staged (moved) from the shared cache to back-end storage. For purposes of explanation, the foregoing again assumes that a cache miss (i.e., a "write miss") occurs, i.e., that data portion 1 is not already present in the shared cache when IO 124 is received. A cache hit occurs when data portion 1 is already present in the shared cache when an associated IO is received. For example, an IO 128 with a request to read or write data portion 1 may be received by processing node $110_2$ after data portion 1 has been copied to the shared cache by processing node $110_1$. In this case the copy of data portion 1 in the shared cache may be used to service the IO 128 without accessing back-end storage 114. For example, the copy of data portion 1 in shared cache may be copied or overwritten depending on whether IO 128 contains a request to read or write.

Although a shared cache may provide some advantages in storage systems and other systems, management of a shared cache may also present some complications. Cache management may include decisions regarding the selection of data portions to be evicted from the shared cache. Data portions may need to be evicted from the cache for various reasons, including but not limited to making space available for other data portions that are required to service IOs. For example, if the shared cache is full and a data portion needs to be copied to shared cache in order to service an TO, then some data may be evicted from the shared cache to provide the necessary space. In a non-shared cache, e.g., when the cache or portion thereof is dedicated to (and perhaps resident on) a single processing node, it is generally known to implement a least recently used (LRU) algorithm that tracks and evicts the least recently used data. However, implementing such an algorithm to access cache entries on a remote shared cache (e.g., on another processing node) may require multiple serial remote memory accesses between processing nodes and the shared cache. Such accesses may be orders of magnitude slower than accesses to cache entries on a local memory (e.g., on the processing node). Further, remote access present an increased risk of creating a disjoint list of recently used data because there are multiple processing nodes sharing the cache. Tag-based solutions in which timestamps are associated with accessed data portions may be less susceptible to disjoint list problems. Each processing node may retrieve and sort a set of timestamps in order to calculate a least recently used data portion when eviction is required. However, retrieving and sorting timestamped records may be computationally costly.

Referring to FIGS. 1 and 2, the shared cache 112 of storage system 101 may be organized into multiple logical ownership areas for data eviction purposes. For example, the logical ownership areas may be address range stripes labelled as stripe 1 through stripe N that correspond to the N processing nodes labelled $110_1$ through $110_N$. The logical ownership areas may be of equal size and are not necessarily stripes. Each stripe includes cache objects, e.g., fixed size cache slots, that may be used to store data portions. Each processing node may be configured with exclusive management authority for a corresponding stripe of the shared cache. For example, processing node $110_1$ may own cache objects $200_1$, processing node $110_2$ may own cache object $200_2$ and processing node $110_N$ may own cache objects $200_N$. When a data portion needs to be evicted from a stripe of the shared cache, the processing node that owns that stripe may select a cache object in that stripe such that, as a result, the data in the selected cache object is evicted. In other words, each logical ownership area may be considered an exclusive eviction domain for one and only one of the processing nodes that share the cache. The shared cache 112 also may include objects that store metadata. In the illustrative example, the objects that store metadata may be fixed size page frames 202. Each page frame may contain multiple TIDs (track ID tables) that include pointers to the data portions in the cache slots of all stripes.

Figure 3:
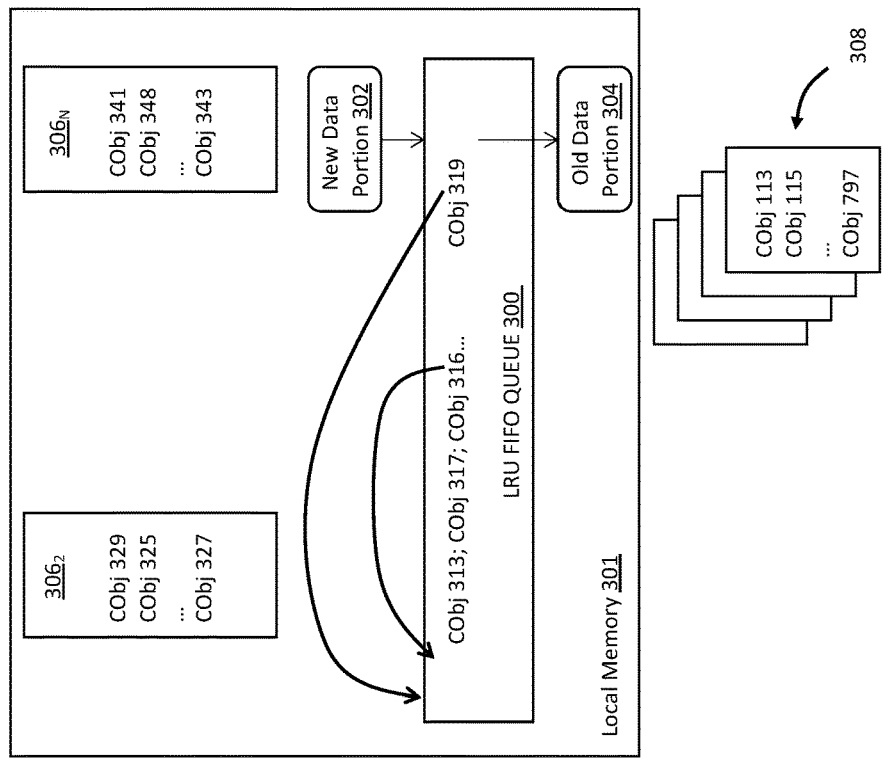
FIG. 3 illustrates an LRU FIFO queue and hash tables that may be maintained by the processing nodes for phased distributed management of the shared cache, according to embodiments of the invention.

Referring to FIGS. 1 and 3, in order to select data for eviction purposes, each processing node $110_1$ through $110_N$ maintains a respective data record $130_1$ through $130_N$ that indicates the temporal proximity of most recent access of each cache object relative to other cache objects in the stripe managed by that processing node. The data records may include LRU FIFO (first-in-first-out) queues that may be maintained locally by each respective processing node, e.g., in volatile memory such as a local memory 301 (i.e., memory within the processing node). In the illustrated example, LRU FIFO queue 300 corresponds to the data record $130_1$ that may be maintained by processing node $110_1$ in local memory 301 to indicate relative temporal proximity of most recent access of each cache object in stripe 1. The LRU FIFO queue 300 need not necessarily indicate how recently each cache object was accessed or when it was accessed. For example and without limitation, the LRU FIFO queue may indicate an order of most recent accesses of cache objects relative to other cache objects in the stripe. In the illustrated example, cache object 319 initially contains the least recently accessed data and cache object 313 initially contains the most recently accessed data. When the data in cache object 316 is subsequently accessed, the LRU FIFO queue 300 may be updated to indicate that cache object 316 is the most recently accessed cache object.

When the need for a free cache object occurs, e.g., for new data portion 302, the old data portion 304 that occupies the least recently accessed cache object 319 as indicated by the LRU FIFO queue may be evicted from the shared cache and the new data portion may be copied into the now available cache object 319. The LRU FIFO queue 300 then may be updated to indicate that cache object 319 is the most recently accessed cache object in stripe 1. The LRU FIFO queue 300, or other data structure serving the purpose, may be updated by adding or changing pointers. Because the LRU FIFO queue 300 may be maintained in memory that is local to the associated processing node, updates to the LRU FIFO queue are fast and efficient in comparison with RDMA operations needed for global cache LRU management. Further, ownership of stripes may help to avoid the disjoint list problem.

The LRU FIFO queue for a given processing node may be updated periodically based on accesses to the owned cache objects by other processing nodes. Each processing node $110_1$ through $110_N$ may maintain a respective set $132_1$-$132_N$ of N-1 data records that indicates accesses by that processing node to data portions in cache objects owned by other processing nodes. The sets of per-stripe data records $132_1$-$132_N$ may include hash tables that are hashed on cache object ID. In the example shown in FIG. 3, processing node $110_1$ uses local memory 301 to maintain N-1 hash tables $306_2$ through $306_N$ corresponding to stripe 2 through stripe N owned by processing nodes $110_2$ through $110_N$. Each hash table may include a record of each cache object in the respective stripe that has been accessed. When a processing node accesses a cache object, for example, when processing an IO operation, the processing node may determine which processing node is the owner of the cache object, e.g., using modulo arithmetic that distributes ownership of cache objects pseudo-randomly.

If the cache object doesn't exist in the hash table, then the processing node creates a new entry in the hash table. If the cache object does exist in the hash table then no action may be required because a cache object need only be included once in a hash table even if the corresponding data was accessed multiple times during a predefined temporal interval. The record of cache objects in the hash tables need not necessarily be ordered, e.g., organized based on relative temporal proximity of most recent access. The hash tables may be distributed via an RDMA to the corresponding processing nodes at different points in time (e.g., periodically, at the end of each phase) in order to prompt updates of the LRU FIFO queues maintained by other processing nodes. For example, processing node $110_1$ sends hash table $306_2$ to processing node $110_2$ and sends hash table $306_N$ to processing node $110_N$. Processing node 1141 also receives hash tables 308 from other processing nodes. The received hash tables 308 indicate cache objects accessed in stripe 1 by processing nodes other than processing node $110_1$. The received hash tables 308 may be used by processing node $110_1$ to update the local LRU FIFO queue 300. Consequently, both the hash table generation and the LRU FIFO queue update may be performed efficiently in local memory, and slower RDMA may be used for periodic distribution of aggregated cache object access information.

Figure 4:
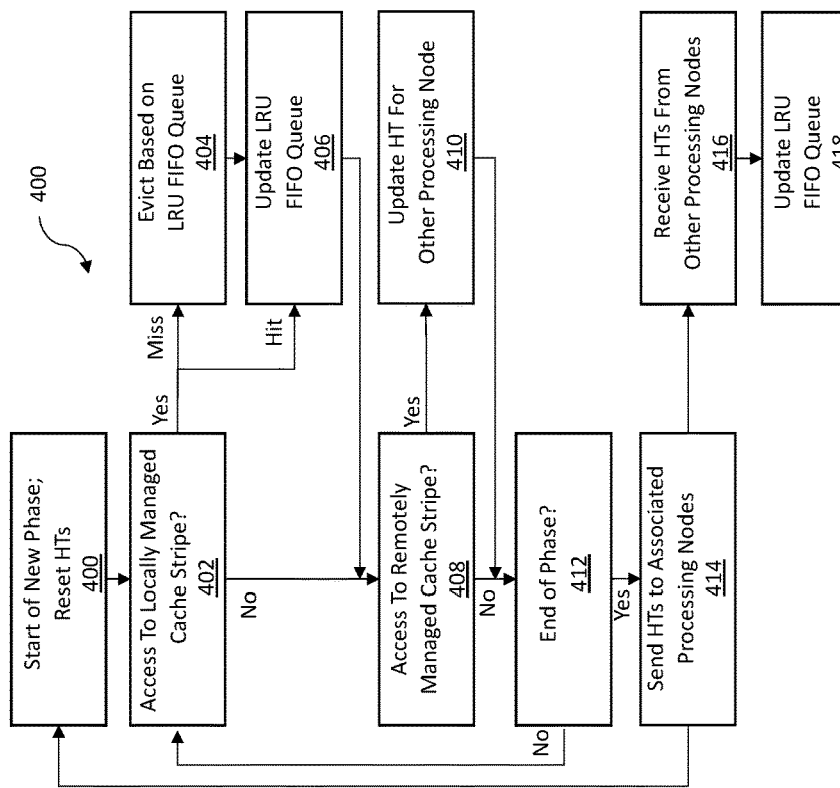
FIG. 4 illustrates an example of a method of managing a shared cache, according to embodiments of the invention.

FIG. 4 illustrates a technique for maintaining the local LRU FIFO queues and hash tables. The technique may be implemented in parallel by each processing node in the storage system 101. For example, the technique may be implemented by instances of logic in each processing node using local non-transitory memory and processors. The processing node may begin a new update phase as indicated in block 400. The phase may be temporal or triggered based on a condition. The duration of the phase may be selected or calculated based on "fall-through time," which is the period of time a data portion will, on average, exist in the cache before being evicted. In general the duration of the phase may be selected to be less than the fall-through time, e.g., some fraction or percentage thereof.

Logic may monitor to determine whether and when the processing node accesses the locally managed cache stripe, for example, when processing an IO operation, as indicated at block 402. For example, processing node $110_1$ (FIG. 1) may access stripe 1. This access may occur repeatedly and in any order with respect to the other illustrated actions during a phase. If an individual access to the locally managed cache stripe, i.e., to a cache object owned by processing node $110_1$ (FIG. 1), in block 402 results in a cache miss then, assuming the stripe is full, the processing node may select the least recently used cache object in the LRU FIFO queue and evict the data portion stored therein in order to free space for a new data portion. The LRU FIFO queue then may be updated as indicated in block 406 to indicate that the selected cache object is now the most recently used cache object. If the access in block 402 results in a cache hit, then the LRU FIFO queue is updated as shown in block 406 to indicate that the corresponding cache object is now the most recently used cache object.

Logic may be configured to monitor and determine whether the processing node accesses a remotely managed cache stripe, i.e., a cache object owned by a different processing node, as indicated at block 408. For example, processing node $110_1$ may access a cache object in stripe 2. This may occur repeatedly and in any order with respect to the other illustrated actions during a given phase. In response to the access, the processing node $110_1$ may update the locally maintained hash table for the remotely managed cache stripe, i.e., the hash table for the other processing node, as indicated in block 410. Functions associated with blocks 402 and 408 may occur any number of times and in any order until the end of the phase is reached as determined in block 412. In response to the end of the phase shown in block 412, the processing node may send the respective hash tables to the associated processing nodes as indicated at block 414. For example, the hash table that indicates accesses to cache objects in stripe 2 may be sent to processing node 110$_2$, and the hash table that indicates accesses to cache objects in stripe N may be sent to processing node 110$_N$. The hash tables in local memory may be reset (cleared) after being distributed to the other processing nodes in preparation for the start of the next new phase as indicated in block 400.

In some embodiments of the invention, a double buffering technique may be employed (e.g., as part of the execution of block 414), where, each hash table on a processing node for another processing node (e.g., 132$_{1-N}$) has a corresponding buffering hash table. At the end of each phase, the contents each hash table for another processing node is moved to its buffering hash table, serialized and sent to the owning processing node. This buffering allows the data to be moved off of the hash table faster so that the hash table is available sooner to receive cache access information for a next phase.

Contemporaneously, or in temporal proximity, to sending the hash tables to the owning processing nodes, the processing node may receive a separate hash table from each of the other processing nodes as indicated in block 416. In response, the processing node may update the LRU FIFO queue based on the accesses to cache objects in stripe 1 by the other processing nodes as listed in the received hash tables as shown in block 418. The update may occur after a new phase has begun.

It should be appreciated that, in accordance with embodiments of the invention, a cache object may physically reside on a first processing node, while the cache access history and eviction decisions for the cache object may be managed (e.g., exclusively) by another processing node. Furthermore, the cache object may be accessed by any of the processing nodes of the system. For example, processing node 110$_2$ may be the cache manager for the cache objects 200$_2$ of the logical cache area of the shared cache called "Stripe 2", but one or more of cache objects 200$_2$ may reside on processing node 110$_1$ or 110$_N$, and each of the processing nodes 110$_{1-n}$ may be able to access the cache objects 200$_2$.

Figure 5:
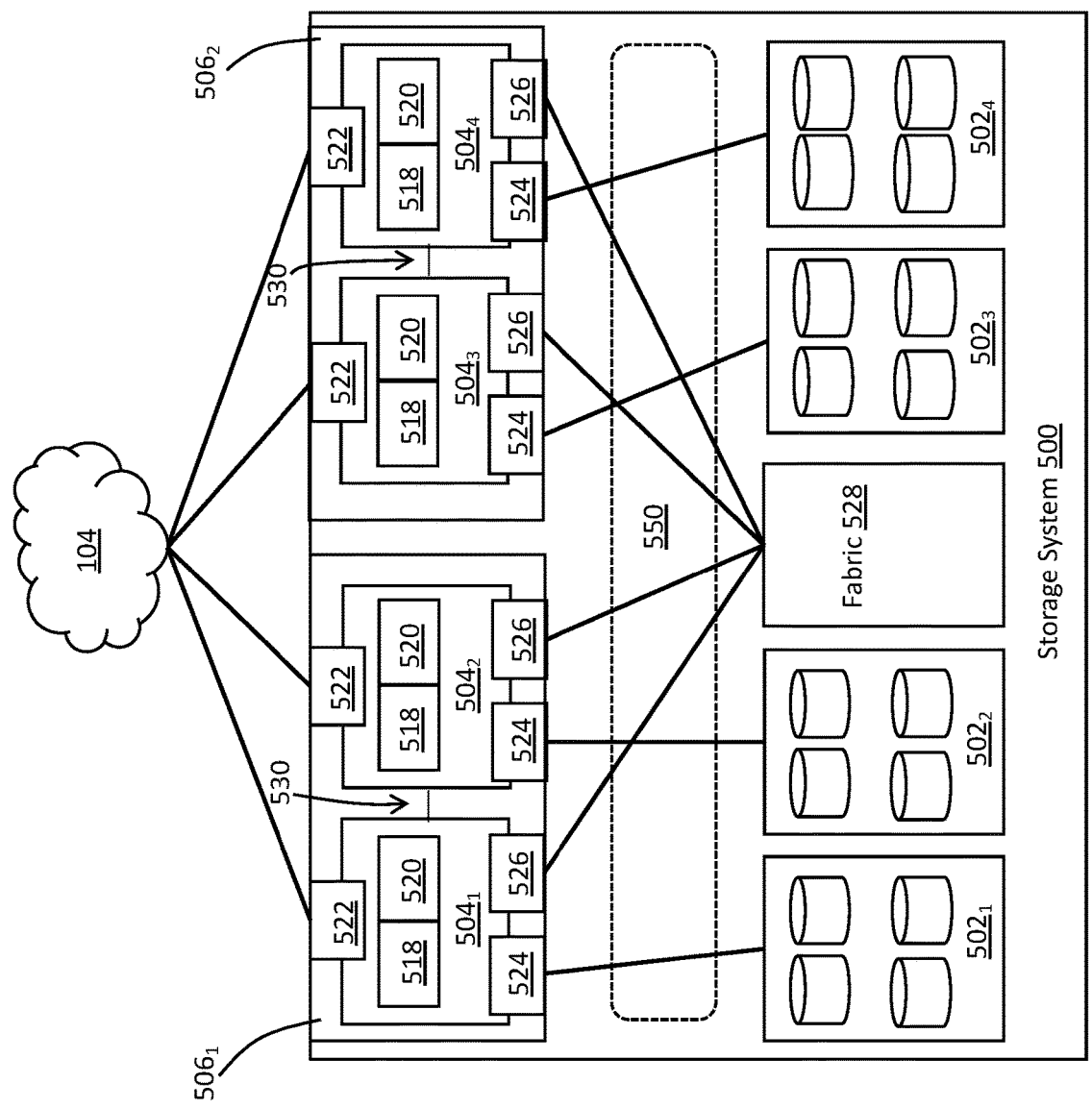
FIG. 5 illustrates another data storage system in which phased distributed management of the shared cache may be implemented, according to embodiments of the invention.

FIG. 5 illustrates another illustrative data storage system 500. Back-end storage includes sets of managed drives 502$_1$-502$_4$, each associated with one processing node. Pairs of processing nodes 504$_1$, 504$_2$ and 504$_3$, 504$_4$ may be organized as storage engines 506$_1$, 506$_2$, respectively. The paired processing nodes of a storage engine may be directly interconnected by communication links 530. Each processing node may include at least one tangible multi-core processor 518 and a local memory 520. The local memory 520 may include, for example, and without limitation, volatile memory components such as RAM and non-volatile memory components such as high performance SSDs. Each processing node may include one or more FEs (front-end directors, aka front end adapters) 522 for communicating with the host, cloud storage, other storage systems and other devices that may be reached via the network 104. Each processing node may also include one or more BEs (back-end directors, aka back-end adapters) 524 for communicating with its associated managed drives. Each processing node may also include one or more CAs (channel directors, aka channel adapters) 526 for communicating with other processing nodes via interconnecting fabric 528. Each processing node may allocate a portion or partition of its respective local memory 520 to a virtual shared cache 550 that may be accessed by other processing nodes, e.g., via DMA (direct memory access) or RDMA (remote direct memory access). In this implementation, the stripe that is owned by each processing node may be the portion or partition of local memory that the processing node allocates to the virtual shared cache.

Figure 6:
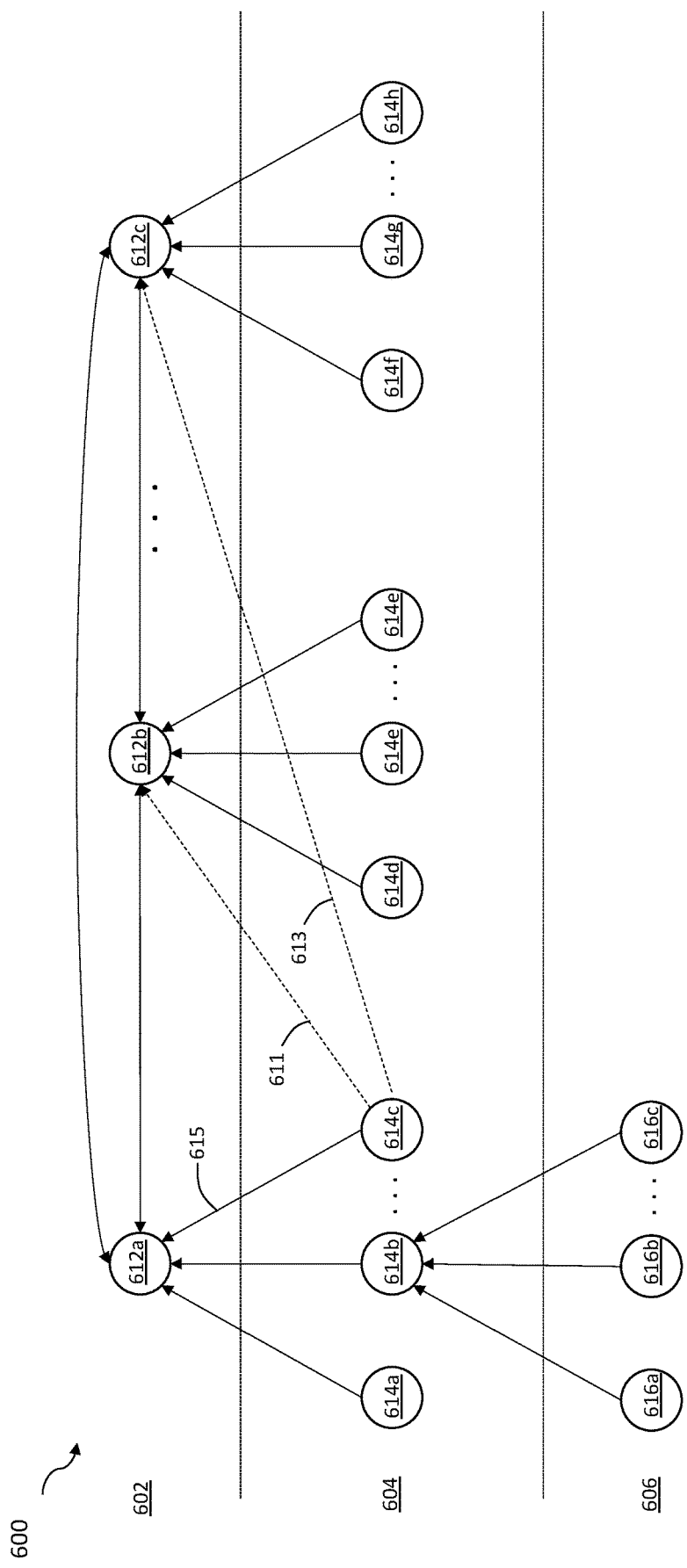
FIG. 6 is a diagram illustrating a cache management hierarchy, according to embodiments of the invention.

FIG. 6 is a diagram illustrating a cache management hierarchy 600, according to embodiments of the invention. Other embodiments of a cache management hierarchy, for example, variations of hierarchy 600, are possible and are intended to fall within the scope of the invention.

Cache management hierarchy 600 may include a plurality of processing nodes 612$a$-$n$, 614$a$-$h$ and 616$a$-$c$, which may be arranged in a plurality of levels of the hierarchy, including the top level 602, the bottom level 606, and one or more middle levels 604. For example: top level 602 may include root nodes 612$a$-$c$; middle level 604 may include branch nodes 614$a$-$h$; and bottom level 606 may include leaf nodes 616$a$-$c$. The root nodes 612$a$-$c$ at the top level may be cache managers as described in more detail elsewhere herein. It should be appreciated that the number of processing nodes shown at each level in FIG. 6 are merely for illustrative purposes, and that each level may have more or less than the quantity shown. The number of levels may be configurable, and may be determined based in part on the number of processing nodes sharing the cache, weighing the benefits of reducing a number of communications of cache access information at the end of each phase against the additional time added to convey cache access information to the cache managers, as result of each additional level.

As illustrated in FIG. 6, in addition to cache access information that it records for each cache object access it performs when processing IO, each root node 612$a$-$c$ of the top level 602 may be configured to receive cache access information (e.g., at the end of each phase) from multiple branch nodes of a top middle level 604, or multiple leaf nodes of the bottom level 606 if there are no middle levels. For example, root node 612$a$ may be configured to receive cache access information from branch nodes 614$a$-$c$. Further, each root node 612$a$-$c$ may be configured to send (e.g., at the end of each phase), to each other root node, the cache access information for the logical cache area owned by the other root node.

In addition to cache access information that it records for each cache object access it performs when processing IO, each branch node of a middle level 604 may be configured to receive cache access information (e.g., at the end of each phase) from multiple branch nodes of next lower level or from multiple leaf nodes of the bottom level 606 if there are only three total levels. For example, branch node 614$a$ may be configured to receive cache access information from leaf nodes 616$a$-$c$. Further, each branch node 612$a$-$c$ may be configured to send, at the end of each phase, all of its cache access information collected during the phase to a designated branch node at a next higher level. If the branch node is on a highest middle level, the branch node may send to each root node, at the end of each phase, the cache access information the branch collected for the logical cache area owned by the root node.

In addition to cache access information that it records for each cache object access it performs when processing IO, each leaf node 616$a$-$c$ may record and sort only cache access information that results from IO operations performed on the leaf node itself; i.e., the leaf node does not receive and/or sort cache access information from any other processing nodes. Further, each leaf node 616$a$-$c$ may be configured to send, at the end of each phase, all of its cache access information collected during the phase to a designated branch node at a next higher level. If there are only two levels such that there are no branch nodes, the leaf node may send to each root node, at the end of each phase, the cache access information the branch collected for the logical cache area owned by the root node.

FIG. 7 illustrates an example of a method 700 of handling cache access information for a shared cache, which may be implemented by a leaf node of a cache management hierarchy, e.g., any of leaf nodes 616a-c, according to embodiments of the invention. Other embodiments of a method of handling cache access information for a shared cache, for example, variations of methods 700 and 800, are possible and are intended to fall within the scope of the invention.

The leaf node may begin a new phase as indicated in block 700, for example, as described in relation to block 400 described in more detail elsewhere herein. Logic may monitor to determine when the leaf node accesses a cache object of the shared cache, as indicated in block 704. In response to accessing the cache object, the leaf node may update the locally maintained hash table for the other processing node (i.e., cache manager) that owns the cache object, as indicated in block 706, for example, as described in relation to block 410. Functions associated with blocks 704 and 706 may occur any number of times during a phase until the end of the phase is reached as determined in block 708. In response to the end of the phase shown in block 708, the processing node may send the respective hash tables to one or more associated processing nodes as indicated at block 710. In embodiments in which there are only two levels in the management hierarchy 600, e.g., the top level 602 and a bottom level 606, the one or more associated processing nodes may be cache managers 612a-c such that the leaf node may communicate the respective hash tables directly to the appropriate managers 612a-c. In embodiments in which there are more than two levels in the management hierarchy 600, e.g., the top level 602, the bottom level 606, and one or more middle levels 604, the one or more associated processing nodes may be a single branch node of a middle level designated to collect cache access information from the leaf node, such that the leaf node sends the hash tables to a branch node of a middle level designated to collect cache access information from the leaf node, e.g., branch node 614b. The hash tables in local memory of the leaf node may be reset (cleared) after being distributed to the one or more other processing nodes in preparation for the start of the next new phase as indicated in block 702.

FIG. 8 illustrates an example of a method 800 of handling cache access information for a shared cache, which may be implemented by a branch node of a cache management hierarchy, according to embodiments of the invention. Other embodiments of a method of handling cache access information for a shared cache, for example, variations of methods 700 and 800, are possible and are intended to fall within the scope of the invention.

The branch node may begin a new phase as indicated in block 802, for example, as described in relation to block 400 described in more detail elsewhere herein. The branch node may receive hash tables from multiple branch nodes at a next lower middle level (if any) or from multiple leaf nodes if there are no middle levels, as indicated in block 803. While illustrated as occurring after the start of the new phase, the hash tables may have been received before the start of the new phase or concurrently thereto but not early enough to have been recorded and sorted during the previous phase and included in the HTs sent to associated processing nodes at the end of the previous phase. Logic may monitor to determine when the branch node accesses a cache object of the shared cache, as indicated in block 804. In response to accessing the cache object, the branch node may update the locally maintained hash table for the other processing node (i.e., cache manager) that owns the cache object, as indicated in block 806, for example, as described in relation to block 410. Functions associated with blocks 804 and 806 may occur any number of times during a phase until the end of the phase is reached as determined in block 808. In response to the end of the phase shown in block 808, the processing node may send the respective hash tables to one or more associated processing nodes as indicated at block 810. In embodiments in which the branch node is in a highest middle level, the one or more associated processing nodes may be cache managers 612a-c such that the branch node may communicate the respective hash tables directly to the appropriate managers 612a-c. In embodiments in which the branch node is not in a highest middle level, the one or more associated processing nodes may be a single branch node of a next higher level designated to collect cache access information from the branch node, such that the branch node sends the hash tables to a branch node of a next highest level designated to collect cache access information from the branch node. The hash tables in local memory of the branch node may be reset (cleared) after being distributed to the one or more other processing nodes in preparation for the start of the next new phase as indicated in block 802.

Root nodes at a top level 602 may be configured to perform method 400 described in more detail elsewhere herein, where the associated, owning processing nodes to whom hash tables are sent per block 414 are the other root nodes (i.e., cache managers) 612a-c, and the hash tables received per box 416 are from branch nodes of a highest middle level 604, if any, or leaf nodes of the bottom level 606 if there are no middle levels. For example, root node 612a may be configured to receive sorted cache access information form branch nodes 614a-c, and may communicate sorted cache access information (e.g., the serialized content of the hash tables) to the other root nodes 612b and 612c.

In some embodiments, rather than a branch node at a highest middle level (or a leaf node if there only two levels) transmitting the appropriate sorted cache access information (e.g., hash table) to each of the root nodes, a branch node may have a designated root node to which it sends all of its sorted cache access information at the end of each phase. For example, rather than branch node 614c sending sorted cache access information to root nodes 612a, 612b and 612c as indicated by reference lines 615, 611 and 613, respectively, branch node 614c may send all its sorted cache access information to root nodes 612a as indicated by reference line 615. Root node 612a then may include the sorted cache access information in the sorted cache access information it sends to the other root nodes 612b and 612c at the end of a next phase. A benefit to such embodiments is a reduction in the number of communications between processing nodes, but at the expense of the delay of the one additional phase.

In some embodiments of the invention, one or more host systems (e.g., host 102) may be directly connected to an internal fabric of a storage system (e.g., storage system 101), for example, as described in more detail elsewhere herein. In such embodiments, the host system may be able to access cache of the storage system over the internal fabric, i.e., on one or more processing nodes independent of any intervening director or control. Further, the host system may include a processing component that includes a computational component and a memory that can be used to implement a portion of a shared cache, where the processing component can exchange communications with the processing nodes of the storage system, and access their memories, across the internal fabric in accordance with RDMA. In such embodiments, for a system comprised of a storage system including a plurality of interconnected processing nodes, and one or more host systems having processing nodes directly connected via the internal fabric of the system to the memory of the processing nodes, the one or more processing nodes of the storage system may be designated as cache managers, and the processing nodes of the host systems designated as leaf nodes, or perhaps even as branch nodes that collect cache access information from processing nodes of other direct-connected host systems.

As previously noted, the duration of the phase may be selected or calculated based on "fall-through time," which is the period of time a data portion will, on average, exist in the cache before being evicted. In general the duration of the phase may be selected to be less than the fall-through time, e.g., some fraction or percentage thereof. For example, a phase may be set to be 0.5 seconds (500 ms) or another period of time. Embodiments of managing shared cache described in relation to FIGS. 1-5, in which each processing node owns a logical cache area of the cache, may be considered "flat" in the sense that all processing nodes are at a same level. For example, in such embodiments, every processing node of the system may be considered to be a root node at a top level of cache management hierarchy, such that the cache management model is flat. In such embodiments, in which there is only one level, each processing node receives cache access information from a during the very next phase; that is, each processing node receives the cache access information for the logical cache area it owns on a one-phase delay. This delay will be the same if a cache management hierarchy has two levels, as the cache managers (i.e., owning processing nodes) will receive the relevant cache access information from leaf nodes at the same time it receives relevant cache access information from other cache managers, i.e., during a next phase.

However, the delay in receiving cache access information increases as the number of levels of a cache increases beyond two. For example, cache management hierarchy 600 has three levels, and the cache managers (e.g., root nodes 612*a-c*) at the top level 602 will not receive cache access information recorded by leaf nodes (e.g., leaf nodes 616*a-c*) at the bottom level 606 until two phases later. That is, if a phase is 0.5 seconds, cache managers will not receive cache access information from leaf nodes until 1 second after the end of the phase in which it was recorded. If there are 4 levels, the delay in the foregoing example will be 1.5 seconds, and thus the "phase delay" can be calculated as a function of the phase, p, and the number of levels, l, as: (l−1)*p.

Thus, when an owning processing node is determining the cache slot from which to evict data, e.g., in response to an IO operation requiring a cache slot, it is missing the most recent cache access information to help inform the decision. Consequently, the processing node may evict a data portion from a cache object (e.g., cache slot) believed to be a least recently used cache object (or one of the least recently used) of a logical cache area in accordance with an LRU algorithm, when in fact the cache slot may have been accessed immediately preceding the eviction, or concurrently thereto. As a result, a more computationally expensive and slower data access from a physical storage device (e.g., disk drive), as opposed to from cache, will need to be made.

The significance of the phase delay depends in part on how long a data portion is allowed to live in cache (i.e., "cache lifetime") before it is evicted, and on known data access patterns. For example, the longer the cache lifetime is relative to the phase delay, the less significant the phase delay. Further, based on empirical observations, after an initial access to a data portion, there is a greater likelihood that the data portion will be accessed relatively soon after the initial access than relatively later, as the probability of access decreases over time. For example, some observations have shown that after an initial access, a data portion may be accessed about 10 times over 0.5 seconds, but after that initial 0.5 seconds, the likelihood of access decreases sharply. Thus, in some embodiments, the phase may be set at 0.5 seconds and the lifetime may be set at 15 or 20 seconds (i.e., 30 or 40 phases). In such embodiments, even if a cache management hierarchy has several levels, the resulting phase delay may be acceptable, as it is highly unlikely that an IO operation will arrive during the last few (or even several) 0.5 s-phases of the 15- or 20-second cache lifetime of a data portion.

Further, if it were desirable to gain back the cache lifetime lost by the phase delay, additional cache lifetime could be added at a relatively low cost. For example, with a 20-second lifetime and 0.5 s phase, each 0.5 s extension of the cache lifetime only increases the size of the cache by 0.5 s/20 s=2.5%. This cost may be considered relatively low relative to the likely cost in gaining back the lost cache lifetime by resorting to some traditional cache management paradigms, in which all processing nodes collectively manage a globally shared LRU FIFO queue, which may be updated by each processing node each time a cache object is accessed.

It should be appreciated that the introduction of phase delay (e.g., 0.5 seconds) may create a less precise implementation of an LRU algorithm than traditional systems, in which the LRU algorithm may have a precision on the order of milliseconds or even microseconds. However, such loss of accuracy may be outweighed (perhaps greatly) by savings of computing and networking resources. Indeed, in some embodiments, the timestamp associated with an access of a cache object that is used for the entry for the cache object in the LRU FIFO queue is not a time of the access, but rather a time at which the cache access information including the information about the access is received by the owning processor (i.e., cache manager) of the logical cache area that includes the cache object. That is, the time of the access is a quantum of the phase (e.g., 0.5 s granularity), as opposed to microsecond or millisecond granularity. Such an embodiment recognizes that for a 15-20-second cache lifetime, microsecond or millisecond access may not be as important as resource savings.

Figure 9:
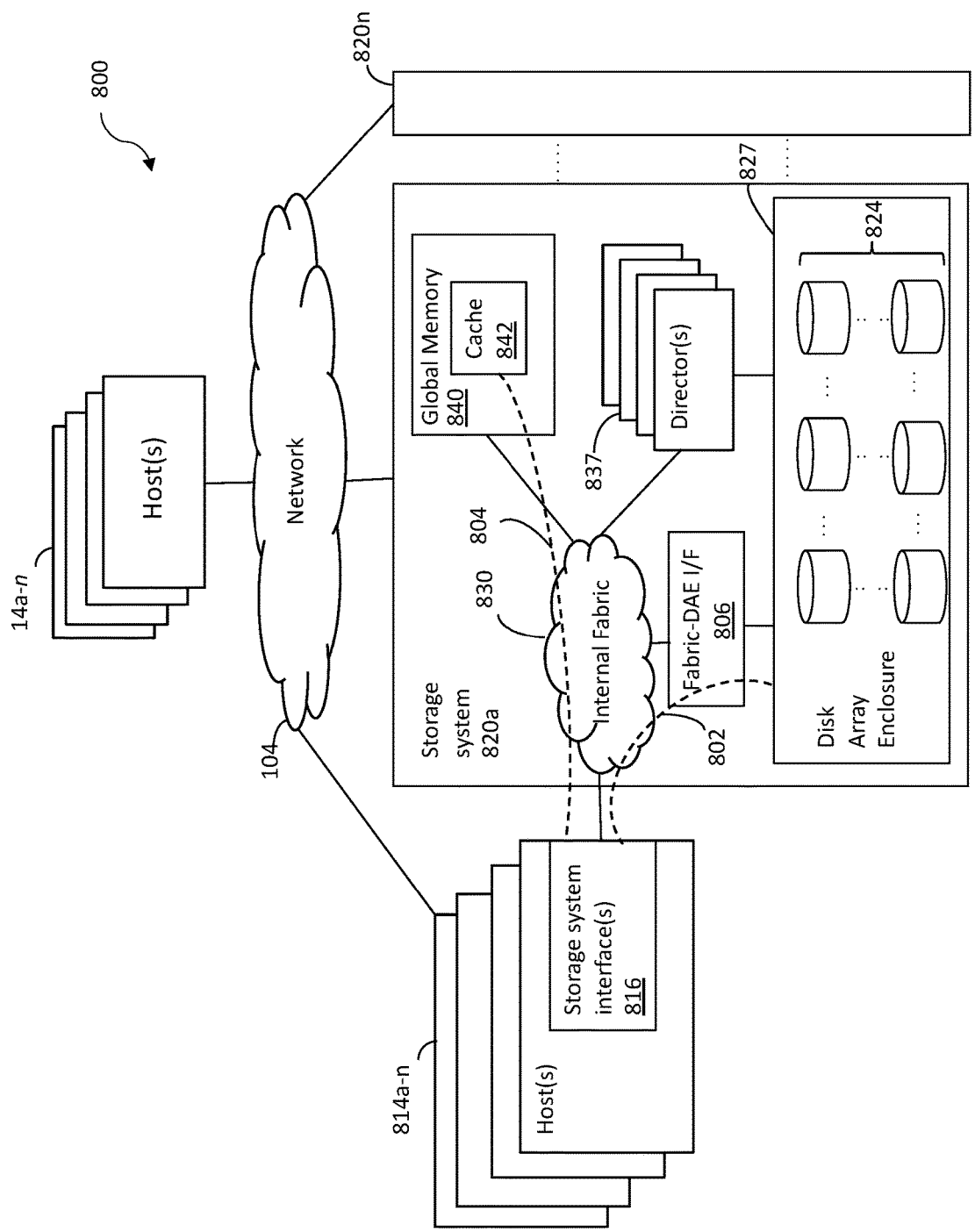
FIG. 9 is a block diagram illustrating an example of a data storage network, including one or more host systems directly connected to internal fabric of a storage system, according to embodiments of the invention.

FIG. 9 is a block diagram illustrating an example of a storage network 800 including one or more host systems 814*a-n* directly connected to an internal fabric 830 of a storage system 820*a*, according to embodiments of the invention. Other embodiments of a storage network including one or more host systems directly connected to an internal fabric of a storage system, for example, variations of system 800, are possible and are intended to fall within the scope of the invention.

Storage network 800 may include any of: one or more host systems 102 (described in more detail elsewhere herein); network 18 (described in more detail elsewhere herein); one or more host systems 814*a-n*; one or more storage systems 820*a-n*; and other components. Storage system 820*a* may include any of: global memory (GM) 840; one or more directors 837; a plurality of physical storage devices 824 (e.g., 116$_{1-m}$), which may be enclosed in a disk array enclosure (DAE) 827; internal fabric 830 (e.g., fabric 528); fabric-DAE interface (FDI) 806, other components; or any suitable combination of the foregoing. Internal fabric 830 may include one or more switches and may be configured in accordance with one or more technologies, for example, InfiniBand. In some embodiments, at least a portion of global memory 840, including at least a portion of cache 842, may reside on one or more circuit boards (e.g., director boards of a PowerMax system) on which one of the directors 837 also resides. In such embodiments, a director 837 may be considered to include at least a portion of global memory 840, including at least a portion of cache 842 in some embodiments. FDI 806 may be configured to manage the exchange of I/O communications between host system 814a-n directly connected to internal fabric 830 and physical storage devices 824 (e.g., within DAE 827).

Each of host systems 814a-n may include a storage system interface (SSI) 816 connected directly to internal fabric 830 and configured to communicate with global memory 840 and physical storage devices 824 (e.g., via FDI 806) over the internal fabric 830 independently of any of the directors 837 or any external network, for example, network 104. In embodiments in which one or more directors 837 may be considered to include at least a portion of global memory 840, including at least a portion of cache 842 in some embodiments, SSI 816 may be configured to communicate with such global memory 840, including cache 842, directly without use of any compute resources (e.g., of a CPU core and/or CPU complex) of any director 837. For example, SSI 816 may be configured to use RDMA to perform such direct communication. Thus, embodiments of the invention in which a host system, or more particularly an SSI, communicates directly with a global memory or cache of a storage system may include: the host system communicating with a portion of global memory or cache not included in a director independently of any director; and/or the host system communicating with a portion of global memory or cache included in a director independently of any compute resources of any director. In both cases, communicating directly with a global memory or cache of a storage system does not involve use of any compute resources of the director.

The global memory 840 may include persistent memory for which data stored thereon persists after the process or program that created the data terminates. For example, at least portions of global memory may be implemented using DIMM (or another type of fast RAM memory) that is battery-backed by a NAND-type memory (e.g., flash). In some embodiments, the data in such persistent memory may persist (for at least some period of time) after the storage system fails.

As illustrated in FIG. 9, each of host systems 814a-n may be connected to any of storage system 820a-n through network 104, for example, through a host bus adapter (HBA) on the host. While not illustrated in FIG. 9, one or more of SSIs 816 may be connected to one or more other storage systems of storage systems 820a-n. It should be appreciated that any of hosts 814a-n may have both: one or more HBAs for communicating with storage systems 820a-n over network 104 (or other networks); and one or more SSIs 816 connected directly to an internal fabric of one or more storage systems 820a-n and configured to communicate with global memory and physical storage devices over the internal fabric independently of any directors or external network.

One or more of the directors 837 may serve as BEs and/or FEs (e.g., 522), and enable I/O communications between the storage system 820a and hosts 102 and/or 814a-n over network 104. Thus, a storage system 820a may concurrently provide host access to physical storage devices 824 through: direct connections to internal fabric 830; and connections via network 104 and one or more directors 837.

SSI 816 may be implemented as described in U.S. patent application Ser. No. 16/389,383, titled "Host System Directly Connected to Internal Switching Fabric of Storage System," by Wigmore et al., the entire contents of which are hereby incorporated by reference.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 400, 700 and 800, or parts thereof, may be implemented using one or more of the systems and/or data structures described in relation to FIGS. 1-3 and 5, 6 and 9, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A method for a system including a plurality of physically discrete processing nodes, wherein each processing node includes a computation component and a memory, and a cache distributed across the plurality of processing nodes, wherein each of the processing nodes collects cache access information for the cache in response to IO operations performed by the processing node, the method comprising:

designating a first subset of the processing nodes as cache managers, each cache manager having an exclusive right to evict data from cache objects in a respective logical area of the cache;

on at least two processing nodes of a second subset of the processing nodes:

collecting cache access information over at least one period of time, including first cache access information corresponding to a first logical area of the cache for which a first of the cache managers has an exclusive right to evict data from cache objects; and communicating at least the first cache access information to at least the first cache manager; and the first cache manager updating cache management information used in selecting cache objects to evict based at least in part on the first cache access information, wherein the first subset includes at least two of the plurality of processing nodes, each of the at least two of the plurality of nodes acting as one of the cache managers, each one of the cache managers having an exclusive right to evict data only from the cache objects in the respective logical area of the cache.

2. The method of claim 1, wherein the collected cache access information includes one or more second cache access information, each second cache access information corresponding to a respective second logical area of the cache, wherein, for each second logical area of the cache, a respective cache manager of the first subset has an exclusive right to evict data from cache objects, wherein the method further comprises:

for each second cache access information corresponding to a respective second logical area of the cache, the at least two processing nodes communicating the second cache access information to the respective cache manager of the second logical area; and each cache manager of the second logical area updating cache management information used in selecting cache objects to evict based at least in part on the first cache access information.

3. The method of claim 2, further comprising each of at least two processing nodes of the second subset:

receiving, from a respective plurality of other processing nodes of the second subset, cache access information collected by the respective plurality of the other processing nodes; and aggregating the received cache access information with cache access information collected on the processing node in response to IO operations performed by the processing node to produce aggregated cache access information, wherein each of the at least first cache access information and the one or more second cache access information include a portion of the aggregated cache access information.

4. The method of claim 3, wherein the cache managers of the first subset form a highest level in a cache management hierarchy, the at least two processing nodes of the second subset form a first middle level of the cache management hierarchy, and the other processing nodes of the second subset form a lowest level of the cache management hierarchy, wherein the method further comprises:

determining a total number of processing nodes on the system; and based on the total number of processing nodes; grouping a subset of the processing nodes of the lowest level to create a second middle level of the cache management hierarchy between the first middle level and the lowest level, each processing node of the second middle level aggregating cache information received from two or more processing nodes that remain in the lowest level, and communicating the aggregated cache information from two or more processing nodes to a respective processing node of the first middle level.

5. The method of claim 1, further comprising:

each of the at least first cache manager aggregating the at least first cache access information with cache access information collected on the first cache manager in response to IO operations performed by the first cache manager to produce aggregated cache access information, wherein the at least first cache manager evicts data from cache objects in a respective logical area of the cache based at least in part on the aggregated cache access information.

6. The method of claim 1, wherein the at least one period of time includes a plurality of periods of time, each of the plurality of periods of time having a first predefined length, and wherein the first cache access information is communicated to the at least first cache manager at predefined intervals of time corresponding to the plurality of periods of time.

7. The method of claim 1, further comprising:

the first cache manager evicting data from one or more cache objects in the first logical area of the cache in response to receiving an I/O operation specifying a data portion that does not have a cache object in cache.

8. A system comprising:

a plurality of physically discrete processing nodes, each processing node including a computation component and a memory; and a cache distributed across the plurality of processing nodes, wherein each of the processing nodes collects cache access information for the cache in response to IO operations performed by the processing node;

executable logic that controls designating a first subset of the processing nodes as cache managers, each cache manager having an exclusive right to evict data from cache objects in a respective logical area of the cache;

on at least two processing nodes of a second subset of the processing nodes:

executable logic that controls collecting cache access information over at least one period of time, including first cache access information corresponding to a first logical area of the cache for which a first of the cache managers has an exclusive right to evict data from cache objects; and executable logic that that controls communicating at least the first cache access information to at least the first cache manager; and executable logic that controls the first cache manager updating cache management information used in selecting cache objects to evict based at least in part on the first cache access information, wherein the first subset includes at least two of the plurality of processing nodes, each of the at least two of the plurality of nodes acting as one of the cache managers, each one of the cache managers having an exclusive right to evict data only from the cache objects in the respective logical area of the cache.

9. The system of claim 8, wherein the collected cache access information includes one or more second cache access information, each second cache access information corresponding to a respective second logical area of the cache, wherein, for each second logical area of the cache, a respective cache manager of the first subset has an exclusive right to evict data from cache objects, wherein the system further comprises:
   executable logic that controls, for each second cache access information corresponding to a respective second logical area of the cache, the at least two processing nodes communicating the second cache access information to the respective cache manager of the second logical area; and
   executable logic that controls each cache manager of the second logical area updating cache management information used in selecting cache objects to evict based at least in part on the first cache access information.

10. The system of claim 9, wherein the system further comprises executable logic that controls each of at least two processing nodes of the second subset:
   receiving, from a respective plurality of other processing nodes of the second subset, cache access information collected by the respective plurality of the other processing nodes; and
   aggregating the received cache access information with cache access information collected on the processing node in response to IO operations performed by the processing node to produce aggregated cache access information,
   wherein each of the at least first cache access information and the one or more second cache access information include a portion of the aggregated cache access information.

11. The system of claim 10, wherein the cache managers of the first subset form a highest level in a cache management hierarchy, the at least two processing nodes of the second subset form a first middle level of the cache management hierarchy, and the other processing nodes of the second subset form a lowest level of the cache management hierarchy, wherein the system further comprises:
   executable logic that controls determining a total number of processing nodes on the system; and
   executable logic that controls, based on the total number of processing nodes; grouping a subset of the processing nodes of the lowest level to create a second middle level of the cache management hierarchy between the first middle level and the lowest level, each processing node of the second middle level aggregating cache information received from two or more processing nodes that remain in the lowest level, and communicating the aggregated cache information from two or more processing nodes to a respective processing node of the first middle level.

12. The system of claim 8, wherein the system further comprises:
   executable logic that controls each of the at least first cache manager aggregating the at least first cache access information with cache access information collected on the first cache manager in response to IO operations performed by the first cache manager to produce aggregated cache access information,
   wherein the at least first cache manager evicts data from cache objects in a respective logical area of the cache based at least in part on the aggregated cache access information.

13. The system of claim 8, wherein the at least one period of time includes a plurality of periods of time, each of the plurality of periods of time having a first predefined length, and
   wherein the first cache access information is communicated to the at least first cache manager at predefined intervals of time corresponding to the plurality of periods of time.

14. The system of claim 8, wherein the system further comprises:
   executable logic that controls the first cache manager evicting data from one or more cache objects in the first logical area of the cache in response to receiving an I/O operation specifying a data portion that does not have a cache object in cache,
   wherein the first subset includes at least two of the plurality of processing nodes, each of the at least two of the plurality of nodes acting as one the cache managers, each one of the cache managers having an exclusive right to evict data only from the cache objects in the respective logical area of the cache.

15. One or more non-transitory computer-readable media for a system including a plurality of physically discrete processing nodes, wherein each processing node includes a computation component and a memory, and a cache distributed across the plurality of processing nodes, wherein each of the processing nodes collects cache access information for the cache in response to IO operations performed by the processing node, and wherein the one or more computer-readable media has software stored thereon, the software comprising:
   executable code that controls designating a first subset of the processing nodes as cache managers, each cache manager having an exclusive right to evict data from cache objects in a respective logical area of the cache;
   executable code that controls, on at least two processing nodes of a second subset of the processing nodes:
      collecting cache access information over at least one period of time, including first cache access information corresponding to a first logical area of the cache for which a first of the cache managers has an exclusive right to evict data from cache objects; and
      communicating at least the first cache access information to at least the first cache manager; and
   executable code that controls the first cache manager to update cache management information used in selecting cache objects to evict based at least in part on the first cache access information,
   wherein the first subset includes at least two of the plurality of processing nodes, each of the at least two of the plurality of nodes acting as one of the cache managers, each one of the cache managers having an exclusive right to evict data only from the cache objects in the respective logical area of the cache.

16. The one or more non-transitory computer-readable media of claim 15, wherein the collected cache access information includes one or more second cache access information, each second cache access information corresponding to a respective second logical area of the cache, wherein, for each second logical area of the cache, a respective cache manager of the first subset has an exclusive right to evict data from cache objects, wherein the software further comprises:
   executable code that controls, for each second cache access information corresponding to a respective second logical area of the cache, the at least two processing nodes communicating the second cache access information to the respective cache manager of the second logical area; and executable code that controls each cache manager of the second logical area updating cache management information used in selecting cache objects to evict based at least in part on the first cache access information.

17. The one or more non-transitory computer-readable media of claim 16, wherein the software further comprises executable code that controls each of at least two processing nodes of the second subset to:

receive, from a respective plurality of other processing nodes of the second subset, cache access information collected by the respective plurality of the other processing nodes; and aggregate the received cache access information with cache access information collected on the processing node in response to IO operations performed by the processing node to produce aggregated cache access information, wherein each of the at least first cache access information and the one or more second cache access information include a portion of the aggregated cache access information.

18. The one or more non-transitory computer-readable media of claim 17, wherein the cache managers of the first subset form a highest level in a cache management hierarchy, the at least two processing nodes of the second subset form a first middle level of the cache management hierarchy, and the other processing nodes of the second subset form a lowest level of the cache management hierarchy, wherein the software further comprises:

executable code that controls determining a total number of processing nodes on the system; and executable code that controls, based on the total number of processing nodes, grouping a subset of the processing nodes of the lowest level to create a second middle level of the cache management hierarchy between the first middle level and the lowest level, each processing node of the second middle level aggregating cache information received from two or more processing nodes that remain in the lowest level, and communicating the aggregated cache information from two or more processing nodes to a respective processing node of the first middle level.

19. The one or more non-transitory computer-readable media of claim 15, wherein the software further comprises:

executable code that controls each of the at least first cache manager aggregating the at least first cache access information with cache access information collected on the first cache manager in response to IO operations performed by the first cache manager to produce aggregated cache access information, wherein the at least first cache manager evicts data from cache objects in a respective logical area of the cache based at least in part on the aggregated cache access information.

20. The one or more non-transitory computer-readable media of claim 15, wherein the at least one period of time includes a plurality of periods of time, each of the plurality of periods of time having a first predefined length, and wherein the first cache access information is communicated to the at least first cache manager at predefined intervals of time corresponding to the plurality of periods of time.

* * * * *